United States Patent [19]

Harris et al.

[11] 3,998,624
[45] Dec. 21, 1976

[54] SLAG FLUIDIZING AGENT AND METHOD OF USING SAME FOR IRON AND STEEL-MAKING PROCESSES

[75] Inventors: Morton E. Harris, Bloomfield Hills; Terrance E. Kelley, Southfield, both of Mich.

[73] Assignee: Mercier Corporation, Birmingham, Mich.

[22] Filed: Oct. 6, 1975

[21] Appl. No.: 619,977

[52] U.S. Cl. .................................. 75/30; 75/53; 75/94
[51] Int. Cl.$^2$ .................................. C21B 5/04
[58] Field of Search .......... 75/30, 94, 53–58, 75/3, 43, 44 R, 44 S

[56] References Cited

UNITED STATES PATENTS

| | | | |
|---|---|---|---|
| 251,570 | 12/1881 | Glass | 75/94 |
| 1,890,485 | 12/1932 | Amsler | 75/53 |
| 2,694,023 | 11/1954 | Hopkins | 75/55 |
| 3,320,052 | 5/1967 | Bowden | 75/53 |
| 3,827,880 | 8/1974 | Greeson | 75/94 |
| 3,881,917 | 5/1975 | Murton | 75/94 |

FOREIGN PATENTS OR APPLICATIONS

| | | | |
|---|---|---|---|
| 808,516 | 2/1959 | United Kingdom | 75/30 |

Primary Examiner—M. J. Andrews
Attorney, Agent, or Firm—Harness, Dickey & Pierce

[57] ABSTRACT

A slag fluidizing and conditioning agent for use in combination with lime and/or limestone as the basic fluxing agent in iron and steel-making processes comprising a particulated mixture composed of controlled proportions of calcium fluoride and a metal aluminum silicate, selected from the group consisting of potassium aluminum silicate, sodium aluminum silicate, calcium aluminum silicate, barium aluminum silicate, as well as mixtures thereof. The slag conditioning agent may further advantageously include a controlled proportion of particulated iron or iron oxide and the mixture preferably is agglomerated in the form of a pellet, briquette or brick employing a fugitive type binder. In its method aspects, the invention is concerned with the use of the slag fluidizing and conditioning agent in combination with lime and/or limestone as the basic flux in iron and steel-making processes, whereby the fluidity of the slag is controlled within a desired level and the chemical fluxing characteristics of the lime constituent are enhanced.

19 Claims, No Drawings

SLAG FLUIDIZING AGENT AND METHOD OF USING SAME FOR IRON AND STEEL-MAKING PROCESSES

BACKGROUND OF THE INVENTION

It is conventional in the melting of iron and in the refining of iron into steel to employ fluxing agents for conditioning the molten slag layer to promote the extraction of impurities from the molten metal bath and to further provide reactive substances for combining with impurities such as sulfur and phosphorus which migrate to and can be effectively extracted with the resultant slag layer. The basic flux employed in iron and steel-making operations is lime or limestone, and particularly, "burnt lime" (CaO), which is effective to condition the molten slag upon dissolution therein. It has also been conventional in accordance with prior art practices to employ lesser amounts of fluorspar ($CaF_2$) as a supplemental slag conditioner and fluxing agent for increasing the fluidity of the slag and to further enhance the rate of dissolution of the lime and its chemical reactivity with the impurities present. The relatively high cost of fluorspar, the toxic and corrosive nature of fume emission in addition to its action on waste water, requiring neutralization, has prompted a continuing search for substitute materials which effectively reduce or eliminate the use of fluorspar without any sacrifice in the slag fluidizing and conditioning characteristics.

Various materials have heretofore been suggested or proposed for use as a partial or complete substitute for fluorspar, of which the composition as described in U.S. Pat. No. 3,799,762 is typical. Of the various prior art slag conditioning agents heretofore proposed, neither have received widespread commercial acceptance either because of their reduced effectiveness and/or their relatively high cost and/or the difficulty associated in their handling and control of the chemistry of the molten bath.

In accordance with the present discovery, a slag conditioning and fluidizing agent is provided which is of comparable effectiveness to fluorspar, which is substantially more economical, which generates less toxic and corrosive fumes, which requires less waste water treatment and which employs constituents which are in plentiful supply.

SUMMARY OF THE INVENTION

The benefits and advantages of the present invention are achieved by a slag fluidizing and conditioning agent adapted for use in conjunction with lime as the basic fluxing agent in iron melting and steel refining processes which comprises a mixture of particles containing from about 5% up to about 95% calcium fluoride, about 5% up to about 95% of a metal aluminum silicate selected from the group consisting of potassium aluminum silicate, sodium aluminum silicate, calcium aluminum silicate, barium aluminum silicate and mixtures thereof, and up to about 75% iron. The particulated mixture is preferably agglomerated by employing a fugitive binder providing pellets, briquettes or blocks of a size facilitating a handling of the slag addition agent, as well as facilitating its addition to the molten bath. In accordance with a preferred embodiment of the present invention, the particulated mixture comprises a mixture of a metallurgical grade fluorspar, feldspar and, particularly, nepheline syenite and a finely-particulated iron oxide.

Additional benefits and advantages of the present invention will become apparent upon a reading of the description of the preferred embodiments taken in conjunction with the specific examples provided.

DESCRIPTION OF THE PREFERRED EMBODIMENTS

The composition of the slag conditioning and fluidizing agent, as well as the proportions thereof employed in iron and steelmaking processes, are herein described in terms of percentages by weight or on a weight basis unless clearly indicated to the contrary.

The permissible proportions, as well as the preferred proportions, of the essential constituents of the slag conditioning and fluidizing agent are set forth in Table 1.

TABLE 1

| Ingredient | COMPOSITION Broad Range, % | Preferred Range, % |
|---|---|---|
| $CaF_2$ | 5% – 95% | 10% – 15% |
| Metal Aluminum Silicate | 5% – 95% | 15% – 25% |
| Iron Constituent | 0 – 75% | 20% – 40% |
| Impurities and Fillers | 0 – 50% | 25% – 50% |
| & Total | 100% | 100% |

The proportions of the constituents as specified in Table 1 are based on the actual concentration of the compounds present. It will be understood that various naturally-occuring minerals can be employed as a source of the specific chemical compounds containing appreciable quantities of other impurities and in such event, appropriate adjustment of the individual minerals will be required in order to provide a net concentration within the ranges as specified in Table 1. The miscellaneous impurities introduced when employing mineral constituents and any filler materials are controlled to provide mixtures containing at least 50% of the active calcium fluoride, aluminum silicate and iron constituents. A satisfactory mixture containing 50% active ingredients comprises 10% $CaF_2$, 15% metal aluminum silicate, 25% iron ingredient and the balance impurities and fillers.

The calcium fluoride constituent is preferably introduced in the form of a concentrated fluorspar which, dependent upon the specific beneficiation process employed to form the concentrate and the purity of the original ore body, may range from about 50% up to about 98% $CaF_2$. Metallurgical grade fluorspars ordinarily contain more than about 70% $CaF_2$ and constitute the preferred materials. Conventionally, imported and domestic beneficiated fluorspars are of a purity of about 97%, and these are particularly satisfactory. The average particle size of the calcium fluoride constituent may range from about 4 mesh to about 1 micron or less, and is preferably distributed over the aforementioned size range.

The metal aluminum silicate constituent may comprise one or a mixture of aluminum silicates selected from the group consisting of potassium aluminum silicate, ($KAlSi_3O_8$); sodium aluminum silicate, ($NaAlSi_3O_8$); calcium aluminum silicate, ($CaAl_2Si_2O_8$); and barium aluminum silicate, ($BaAl_2Si_2O_8$). The aluminum silicate compounds are preferably introduced in the form of a mixture as found in nature in naturally-occurring mineral feldspars, and particularly, alkali feldspars of which nepheline syenite constitutes a preferred mineral source. A typical chemical analysis of a nepheline syenite is set forth in Table 2.

TABLE 2

TYPICAL COMPOSITION - NEPHELINE SYENITE

| Ingredient | Percent |
| --- | --- |
| Silicon Dioxide | 60.0 |
| Alumina | 23.3 |
| Iron Oxide | 0.37 |
| Calcium Oxide | 0.70 |
| Magnesium Oxide | 0.080 |
| Sodium Oxide | 9.9 |
| Potassium Oxide | 4.9 |
| Miscellaneous | 0.74 |

The calcuim oxide, sodium oxide and potassium oxide constituents as set forth in Table 2 are combined with the alumina and silica in the form of the corresponding metal aluminum silicates. The particle size of the feldspar similarly is controlled to an average size of less than about 4 mesh to as small as 1 micron or smaller. The particular particle size, as in the case of the calcium fluoride constituent, is preferably controlled so as to provide a random particle distribution over the permissible size range, with the optimum particles and size distribution being dependent in part upon the manner by which the mixture is agglomerated into pellets or bricks or whether the mixture is simply to be packaged in bags or containers for addition to the molten bath.

The iron constituent of the slag conditioning and fluidizing agent as set forth in Table 1 constitutes an optional but preferred ingredient in that its presence in combination with the calcium fluoride and metal aluminum silicate constituents has been found to provide fluxing characteristics when uniformly distributed in the form of fine-sized particles throughout the particulated free-flowing or agglomerated mixture. The iron constituent can be in the form of particulated metallic particles, such as derived from scrap, and more usually is in the form of an iron oxide as derived from beneficiated iron ore, or alternatively, as iron oxide waste products, such as basic oxygen furnace precipitator dust, mill scale or the like, as well as mixtures thereof. As shown in Table 1, the particulated iron constituent can be employed in amounts up to about 75% of the mixture, while amounts ranging from about 20% up to about 40% are preferred.

It is also contemplated that other filler materials may suitably be incorporated in the mixture serving as a diluent and/or extender for facilitating a more uniform release and distribution of the active constituents upon entry into the molten bath. Typical of such extender fillers is limestone, which also contributes to the basic fluxing characteristics of the iron or steel bath, and may usually be employed in amounts up to about 25% of the mixture.

In addition to such extender-type filler materials, the mixture may further include, as in the case of agglomerated briquettes or pellets, suitable fugitive-type binding agents in an amount normally ranging from about 5% up to about 10% thereof. The agglomeration of the mixture into briquettes or pellets constitutes a preferred practice in that it facilitates the handling and addition of the slag conditioning agent into the molten mass and further prevents loss of the effective constituents by entrainment in the flue gases. The use of agglomerates also assures penetration of the slag conditioning agent through the molten bath, whereupon a controlled release of the particles upon disintegration of the binding constituent is effected to enable a conditioning and fluidizing of the bath.

The binding agent employed for agglomerating the particulated mixture may comprise any of those known in the art which are operative to disintegrate when exposed to the high temperature conditions present in the furnace or cupola. Typical of such binding agents are molasses and lime, lignite, tarry substances such as pitch or tall oil, sodium silicate, as well as Portland cement itself. The binder is employed in amounts so as to provide satisfactory strength in the briquette or pellet to facilitate a handling thereof during shipment and storage, as well as during its addition by mechanized equipment into the furnace or crucible. Ordinarily, binder contents of around 2% to as high as 20% can be employed, while concentrations of from about 5% to about 10% are usually adequate.

In accordance with the process aspects of the invention, the agglomerated or packaged slag conditioning and fluidizing agent is added to molten baths of iron or steel in a manner and in an amount identical to that employed in accordance with prior art practices when employing metallurgical fluorspar. Accordingly, the concentration of the slag conditioning agent may broadly range from as little as ½ pound per ton of molten metal up to as high as about 20 pounds per ton consistent with accepted iron and steel-making practices.

In order to further illustrate the present invention, the following examples are provided. It will be appreciated that the examples are provided for illustrative purposes and are not intended to be limiting of the scope of the present invention as herein described and as set forth in the subjoined claims.

| Slag Conditioning Agent | |
| --- | --- |
| Ingredient | Percent by Weight |
| $CaF_2$ | 15 |
| Metal Aluminum Silicate | 30 |
| Iron Oxide | 15 |
| Limestone Filler | 24.5 |
| Miscellaneous Impurities | 15.5 |
| | 100% |

The calcium fluoride constituent as set forth in the foregoing table is added in the form of an acid-grade fluorspar having an average particle size of less than about 200 mesh and being of a purity of about 97%. The metal aluminum silicate constituent is of an average particle size less than 30 mesh and corresponds to a nepheline syenite having a nominal composition as set forth in Table 2. The iron oxide is of a nominal particle size less than 200 mesh and is derived as a waste product from a basic oxygen plant precipitator (BOP) dust. The limestone filler is of an average particle size less than 8 mesh and is in the form of waste fines. The miscellaneous impurities comprising 15.5% of the particulated mixture comprises gangue and other mineral impurities present in the fluorspar, BOP dust and nepheline syenite, approximately 1% moisture and approximately 4% carbon introduced via the binder employed for forming an agglomerated briquette.

The particulated mixture, after uniform mixing, is mixed with 10% binder comprising a molasses-lime mixture and is thereafter agglomerated into pillow-shaped briquettes having a nominal size of 2-¼ inch by 2-¼ inch by 1-¼ inch.

In the basic oxygen steel-making process, a typical heat is prepared comprising 385,792 pounds of hot metal, 172,000 pounds steel scrap and 13,000 pounds cast iron scrap, to which 39,000 pounds burnt lime and 3,000 pounds dolomite lime are added, along with 1,000 pounds of the aforementioned briquetted slag conditioning agent. The steel is refined in accordance with a basic oxygen furnace refining technique employing a flow of oxygen for a duration of about 20 to about 30 minutes at a rate of 22,500 cubic feet of oxygen per minute.

EXAMPLE 2

A heat similar to that described in Example 1 is prepared employing 410,000 pounds hot metal, 147,000 pounds steel scrap and 13,000 pounds cast iron scrap, to which 32,000 pounds burnt lime and 3,000 pounds dolomite are added, along with 1,000 pounds of a metallurgical grade gravel fluorspar. The steel is refined in accordance with the basic oxygen furnace refining technique in a manner substantially identical to that described in Example 1.

A comparison of the refined steel derived from Examples 1 and 2 reveals that the slag conditioning and fluidizing agent of the present invention as employed in Example 1 provides comparable performance to that of the metallurgical grade fluorspar of Example 2 and further provides the dual advantage of a substantial reduction in material costs and less severe fume and water treatment conditions.

EXAMPLE 3

A particulated mixture of a flux conditioning and fluidizing agent is prepared containing 45% by weight of an acid-grade fluorspar containing about 98% by weight $CaF_2$ having an average particle size of less than about 200 mesh; 45% by weight of nepheline syenite of a composition corresponding to that previously set forth in Table 2, having an average particle size less than about 30 mesh; and 10% of a Portland cement binder. The particulated mixture, after uniform blending, is agglomerated into bricks of a nominal size of 3-;182 inch by 3-¾ inch by 7-½ inch long.

In a ductile iron melting process, a typical charge is prepared containing 2,250 pounds steel, 1,600 pounds cast iron scrap, 45 pounds silicon, 6 pounds manganese, 600 pounds coke, 380 pounds limestone and 70 pounds of the aforementioned flux conditioning and fluidizing agent in brick form. Approximately 20,000 cubic feet per minute of air is blown through the tuyeres of the cupola, producing a base iron. The flux conditioning and fluidizing agent of the present invention provides a satisfactory conditioning and fluidizing of the slag comparable to that obtained when using a corresponding quantity on a weight-for-weight basis of acid-grade fluorspar. The use of the flux conditioning agent of the present invention provides the further advantage in effecting over a 50% reduction of fluorine units in the slag system, pollution control equipment and wet scrubbers in addition to providing a considerable cost reduction over the use of conventional fluorspar.

While it will be apparent that the invention herein described is well calculated to achieve the benefits and advantages as set forth above, it will be appreciated that the invention is susceptible to modification, variation and change without departing from the spirit thereof.

What is claimed is:

1. A slag fluidizing and conditioning agent for use in melting or refining of iron and steel in combination with lime and/or limestone as the basic fluxing agent which comprises a particulated mixture containing as its essential constituents about 5% to about 95% calcium fluoride, about 5% to about 95% of a metal aluminum silicate selected from the group consisting of potassium aluminum silicate, sodium aluminum silicate, calcium aluminum silicate, barium aluminum silicate and mixtures thereof, up to about 75% of an iron ingredient selected from the group consisting of metallic iron, iron oxide, and mixtures thereof; and up to 50% miscellaneous impurities and fillers.

2. The slag fluidizing and conditioning agent as defined in claim 1, in which said calcium fluoride is present in an amount of about 10% to about 15%, said metal aluminum silicate is present in an amount of about 15% to about 25%, said iron ingredient is present in an amount of about 20% to about 40% of said mixture.

3. The slag fluidizing and conditioning agent as defined in claim 1, in which said calcium fluoride is present in an amount of about 10%, said metal aluminum silicate is present in an amount of about 15% and said iron ingredient is present in an amount of about 25% of said mixture.

4. The slag fluidizing and conditioning agent as defined in claim 1, wherein said calcium fluoride is present in the form of fluorspar.

5. The slag fluidizing and conditioning agent as defined in claim 1, wherein said metal aluminum silicate is present in the form of an alkali feldspar.

6. The slag fluidizing and conditioning agent as defined in claim 1, wherein said metal aluminum silicate is present in the form of nepheline syenite.

7. The slag fluidizing and conditioning agent as defined in claim 1, wherein said iron ingredient is present in the form of iron oxide.

8. The slag fluidizing and conditioning agent as defined in claim 1, wherein said mixture is in the form of am agglomerated briquette incorporating a fugitive binder present in an amount sufficient to retain the particles in bonded relationship prior to the addition to a molten bath.

9. The slag fluidizing and conditioning agent as defined in claim 1, further including up to about 25% limestone as a filler based on the total weight of said mixture.

10. A method of fluidizing and conditioning a molten bath of ferrous metal and slag incorporating lime or limestone as a basic fluxing agent which comprises the steps of adding to the molten bath a fluidizing agent contaning as its essential constituents about 5% to about 95% calcium fluoride, about 5% to about 95% of a metal aluminum silicate selected from the group consisting of potassium aluminum silicate, sodium aluminum silicate, calcium aluminum silicate, barium aluminum silicate and mixtures thereof, and up to about 75% of an iron ingredient selected from the group consisting of metallic iron, iron oxide, and mixtures thereof, and up to about 50% miscellaneous impurities and fillers, and maintaining said bath in a molten condition to effect a dissolution of the lime and said fluidizing agent.

11. The method as defined in claim 10, in which said fluidizing agent contains about 10% to about 15% calcium fluoride, about 15% to about 25% metal aluminum silicate, and about 20% to about 40% of said iron ingredient.

12. The method as defined in claim 10, in which said fluidizing agent contains about 10% calcium fluoride, about 15% metal aluminum silicate, and about 25% iron.

13. The method as defined in claim 10, wherein said calcium fluoride is introduced in the form of fluorspar.

14. The method as defined in claim 10, wherein said metal aluminum silicate is in the form of feldspar.

15. The method as defined in claim 10, wherein said metal aluminum silicate is introduced in the form of nepheline syenite.

16. The method as defined in claim 10, wherein said iron ingredient is in the form of iron oxide.

17. The method as defined in claim 10, wherein said fluidizing agent is introduced in the form of an agglomerated particulated mixture incorporating a fugitive binder.

18. The method as defined in claim 10, in which said fluidizing agent further incorporates up to about 25% limestone as a filler.

19. The method as defined in claim 10, in which said fluxing agent comprises a mixture of fluorspar, nepheline syenite and iron oxide.

\* \* \* \* \*